US012790093B2

(12) United States Patent
Job et al.

(10) Patent No.: US 12,790,093 B2
(45) Date of Patent: Nov. 10, 2026

(54) DETERGENT PRESENTATION FORM

(71) Applicant: HENKEL AG & CO. KGAA, Düsseldorf (DE)

(72) Inventors: Mareile Job, Leverkusen (DE); Matthias Sunder, Düsseldorf (DE); Arno Düffels, Düsseldorf (DE); Marouane Jaafour, Willich (DE); Steffen Ristau, Düsseldorf (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 107 days.

(21) Appl. No.: 18/994,101

(22) PCT Filed: Mar. 27, 2023

(86) PCT No.: PCT/EP2023/057781

§ 371 (c)(1),
(2) Date: Jan. 14, 2025

(87) PCT Pub. No.: WO2024/012727

PCT Pub. Date: Jan. 18, 2024

(65) Prior Publication Data

US 2026/0250056 A1 Aug. 27, 2026

(30) Foreign Application Priority Data

Jul. 14, 2022 (EP) .................................... 22184935

(51) Int. Cl.

| | |
|---|---|
| ***B65D 77/02*** | (2006.01) |
| ***B65D 5/56*** | (2006.01) |
| ***B65D 5/66*** | (2006.01) |
| ***B65D 85/00*** | (2006.01) |
| ***C11D 17/00*** | (2006.01) |
| ***C11D 17/04*** | (2006.01) |

(52) U.S. Cl.

CPC ............ *B65D 77/02* (2013.01); *B65D 5/563* (2013.01); *B65D 5/6602* (2013.01); *B65D 85/70* (2013.01); *C11D 17/0047* (2013.01); *C11D 17/041* (2013.01)

(58) Field of Classification Search

CPC ...... B65D 77/02; B65D 5/563; B65D 5/6602; B65D 85/70; C11D 17/0047; C11D 17/041

USPC .................................... 206/499, 77.1, 524.1

See application file for complete search history.

(56) References Cited

U.S. PATENT DOCUMENTS

2014/0238889 A1* 8/2014 Sunder .................... C11D 3/50 53/445
2017/0298308 A1* 10/2017 Labeque ................ B65D 43/22
2021/0347524 A1* 11/2021 Hoefte .................... B65D 5/685
2022/0089342 A1* 3/2022 Ashton .................. B65D 5/563
2023/0103439 A1* 4/2023 Hoefte .................... B65B 5/024 206/525

FOREIGN PATENT DOCUMENTS

EP 1199254 A1 4/2002

OTHER PUBLICATIONS

International Search Report dated Jul. 10, 2023 issued in PCT/EP2023/057781.
Written Opinion dated Jul. 10, 2023 issued in PCT/EP2023/057781.

* cited by examiner

*Primary Examiner* — Jacob K Ackun
(74) *Attorney, Agent, or Firm* — Blank Rome LLP

(57) ABSTRACT

A washing agent presentation form is described. The washing agent presentation form includes an outer packaging having a bottom wall, a top wall, and side walls connecting the bottom wall and the top wall. The washing agent presentation form also includes cuboid-shaped detergent bodies each having a lower face, an upper face, and a lateral face between the lower face and the upper face. The outer packaging contains at least eight of the cuboid-shaped detergent bodies layered within the outer packaging such that each of the cuboid-shaped detergent bodies is adjacent to at least three other cuboid-shaped detergent bodies. The outer packaging has a fill level of from 50 vol. % to 84 vol. % and 35% to 80% of the void volume within the outer packaging is between an upper side of an upper layer of cuboid-shaped detergent bodies and an inner surface of the top wall.

20 Claims, No Drawings

DETERGENT PRESENTATION FORM

CROSS-REFERENCE TO RELATED APPLICATIONS

This application is a National Stage of International Patent Application No. PCT/EP2023/057781, filed Mar. 27, 2023, which claims foreign priority to EP Application Serial No. 22184935.9, filed Jul. 14, 2022, the disclosures of which are hereby incorporated by reference in their entireties.

FIELD OF THE INVENTION

The present invention relates to a washing agent presentation form, comprising an outer packaging and washing agent shaped bodies which are in a sorted arrangement in the outer packaging. In particular, the invention relates to washing agent presentation forms which have sorted washing agent shaped bodies and outer packagings with specific degrees of filling.

BACKGROUND

Continuously changing requirements are placed on the forms of manufacture and supply of washing and cleaning agents. The main focus has, for quite some time, been on the convenient dosing of detergents and cleaning agents by the consumer and the simplification of the work steps necessary for carrying out a washing or cleaning method. A technical solution is provided by pre-portioned washing or cleaning agent metering units, for example water-soluble containers having one or more receiving chambers for powdered or liquid washing or cleaning agents. A further technical solution is provided by detergent tablets which can have a single-phase or multi-phase design.

Both the water-soluble containers and the washing agent tablets are generally hygroscopic, due to the active substances contained therein. In order to prevent water absorption, the pre-portioned washing or cleaning agent metering units are individually packaged by means of water-impermeable packaging means, for example flow packs based on water-insoluble polymer films. Alternatively, a plurality of washing or cleaning agent metering units can be packaged in a container which in turn has a water vapor barrier and in this way reduces the admission of water to the metering units.

Regardless of whether the packaging means used to reduce the admission of water enclose individual washing or cleaning agent metering units or a plurality of washing or cleaning agent metering units, the use thereof is undesirable for ecological reasons. An aim of the development of novel washing agent presentation forms is therefore to provide packaging solutions and manufacturing forms which, on the basis of recycled or recyclable or biodegradable materials, as far as possible achieve the technical advantages of biologically non-recycled or non-recyclable or non-biodegradable materials. The optimization and continued development of already existing, sustainable technical solutions offers a starting point for this development.

A technical problem which has attracted particular attention with respect to washing or cleaning agent metering units, in particular to washing or cleaning agent tablets, is that of ensuring the transport and storage stability of these metering units. The concept of transportation and storage stability includes not only ensuring the physical stability of the washing or cleaning agent metering units, for example against breakage, but also ensuring the chemical stability of the washing or cleaning agent metering units, for example against premature abreaction and disintegration of the 3D shape caused by abreaction. A conventional approach for ensuring the transport and storage stability of washing or cleaning agent tablets consists in packaging these tablets by means of individual flow pack packaging having three-sided weld seams and the fin seams characteristic of these flow packs. These flow packs are generally produced from non-biodegradable, water-insoluble polymer films and, in addition to the washing or cleaning agent metering unit, also enclose a considerable air volume. In the case of mechanical stress, this air volume and the above-mentioned fin seams ensure the physical integrity of the metering units due to their damping effect. In addition, the water-insoluble polymer films prevent unwanted admission of water from the ambient air, and thus also chemically stabilize the washing or cleaning agent metering units.

The disadvantage of this technical solution is its comparatively high use of non-biodegradable packaging materials and the comparatively high packaging volume per dosing unit.

SUMMARY OF THE INVENTION

Against the background of the prior art described above, the object of the application was to provide washing agent portion units which can be produced by means of simplified methods, have a high transport and storage stability, and can be prepared in a simple manner using the smallest amounts of packaging means in containers. Finally, the washing agent portion units should have a high product performance and be easy and safe to handle for the consumer.

A washing agent presentation form is suitable for achieving these objects and comprises:

a) an outer packaging having a bottom surface, a top surface, and side walls connecting the bottom surface and the top surface, b) cuboid washing agent shaped bodies having a lower face, an upper face and a lateral face connecting the lower face and the upper face, wherein i) the outer packaging contains at least eight washing agent shaped bodies which are arranged in layers in the outer packaging such that each of the washing agent shaped bodies is adjacent to at least three other washing agent shaped bodies;

ii) the outer packaging has a fill level of 50 vol. % to 84 vol. %;

iii) 35% to 80% of the void volume of the outer packaging is between the upper side of the upper shaped body layer and the inner side of the top surface.

DETAILED DESCRIPTION

Surprisingly, it has been found that, in outer packagings with a medium fill-level, an improvement in the storage and transportation stability of the shaped bodies can be brought about when it comes to the sorting and arrangement, which characterizes the subject matter of the claim, of the washing agent shaped bodies within the outer packaging.

The outer packaging is preferably designed as a single-piece folding box. Preferred outer packagings have a flat bottom surface, the largest diagonal of which is greater than the height of the outer packaging. This design of the outer packaging increases its stability and enables simple opening and removal. It is particularly preferred if the outer packaging has a flat bottom surface, the largest diagonal of which is more than twice, preferably more than four times the height of the outer packaging.

To achieve the fill level and reduce the use of packaging material, it has proven advantageous for the outer packaging to have an angular bottom surface, preferably a quadrilateral bottom surface, very particularly preferably a rectangular bottom surface. For the same reason and for improving the stackability of the outer packagings, it is preferred that the outer packaging has a top surface that is plane-parallel to the bottom surface. Outer packagings in cuboid form are particularly preferred.

For increasing storage stability, in particular the chemical stabilization of the washing agent shaped bodies, it has proven advantageous for the outer packaging to be reclosable. Suitable closure elements are, for example, adhesive, latching, snapping or plug-in elements, wherein adhesive and plug-in elements are particularly preferred. Exemplary closure elements are plug-in closures or removable adhesive closures.

For reasons of sustainability, recycled and/or recyclable materials are preferred for the production of the outer packaging. The packaging materials are preferably based on renewable raw materials. The use of packaging materials based on pulp and waste paper is particularly preferred.

In a first preferred embodiment, the outer packaging is made of cardboard. In addition to its availability and recyclability, the advantages of cardboard lie in the great variability of available types and grammages. Preferred cardboards have a grammage of 150 to 400 g/m$^2$.

In a particularly preferred embodiment the corrugated cardboard, which has proven to be technically superior to cardboard in some respects, is used for manufacturing the outer packaging. Corrugated cardboard is characterized by a high strength with low net weight and is a suitable means for storage and transportation even in large containers.

In order to improve transport stability and avoid tablet breakage, at least one of the side walls of the outer packaging has one cavity or several cavities, the volume(s) of which is/are at least 10 vol. % of the volume of the side wall.

The design of the side walls of the outer packaging with inclusion of cavities has proven to be surprisingly advantageous for the physical stability of the washing agent shaped bodies. Preferably, at least one of the side walls has a hollow volume which is at least 10 vol. % of the volume of the side wall. Further improved stabilization of the washing agent shaped bodies can be achieved if at least two of the side walls have hollow volumes which are at least 10 vol. % of the volume of the relevant side wall, with it being particularly advantageous if two opposing side walls of the outer packaging have hollow volumes which are at least 10 vol. % of the volume of the relevant side wall. Very particular preference is given to washing agent presentation forms in which all the side walls of the outer packaging have hollow volumes which are at least 10 vol. % of the volume of the relevant side wall.

In addition to physical stability, the chemical stability of the washing agent shaped bodies is surprisingly also promoted by the integration of hollow volumes into the side walls of the outer packaging. A conceivable explanation is that the admission of water from the outside into the interior of the outer packaging is made more difficult by the hollow volumes interrupting the material of the side walls and/or the hollow volume in the side walls provides a buffer against the admission of moisture.

For the aforementioned reasons, particularly preferred outer packagings have one or more side walls in which the hollow volume is at least 20 vol. %, and preferably at least 40 vol. %, of the volume of the relevant side wall.

The hollow volume in the side walls of the outer packaging can be realized, for example, by using corrugated cardboard. A preferred alternative or supplement to the corrugated cardboard is offered by crimping boxes or hollow edge boxes which are suitable, due to their construction, for realizing hollow volumes in the range of 10 vol. % and higher.

In a particularly preferred embodiment, the outer packaging is designed as a box having a hinged lid.

In a preferred embodiment, the outer packaging is designed as a single-piece folding box and has a bottom surface and four side surfaces hinged to the bottom surface, and a top surface and at least three side surfaces hinged to the top surface. The single-piece design of the outer packaging increases its stability and simplifies its production.

In a particularly preferred embodiment, the outer packaging is designed as a single-piece folding box which comprises a bottom surface and four side surfaces hinged to the bottom surface as well as a top surface and at least three side surfaces hinged to the top surface, wherein the side surfaces of the outer packaging hinged to the top surface overlap with the side surfaces hinged to the bottom surface of the outer packaging in the closed state.

As already stated, preferred outer packagings are resealable. A particularly preferred embodiment is folding boxes with folding lids, wherein, in the closed state, parts of the lid preferably overlap with other parts of the box at least partially. By way of example are washing agent presentation forms in which the outer packaging is present in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging such that the outer sides of the side surfaces hinged to the top surface are in contact with the inner sides of the side surfaces hinged to the bottom surface of the outer packaging. In a preferred embodiment of this detergent supply form, at least 30%, preferably at least 60%, and in particular at least 80%, of the area of the outer sides of the side surfaces hinged to the top surface overlaps with at least 30%, preferably at least 60%, and in particular at least 80%, of the area of the inner sides of the side surfaces hinged to the bottom surface of the outer packaging.

In this embodiment, the lid closure is preferably reinforced by friction of the overlapping box parts. This type of lid closure, in which the side surfaces hinged to the top surfaces are guided into the interior of the box, can, in the case of high degrees of filling, and in particular in the case of the outer packaging being filled with washing agent shaped bodies which increase their volume during the course of storage, lead to problems during lid closure, since the side surfaces hinged to the top surface can only be inserted into the interior of the box with difficulty.

Against this background, it may be appropriate to provide alternative washing agent presentation forms in which the outer packaging is in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging such that at least one inner side of a side surface hinged to the top surface is in contact with at least one outer side of the side surfaces hinged to the bottom surface of the outer packaging.

For the reasons mentioned above, washing agent presentation forms are also preferred in which the outer packaging is in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging such that all inner sides of the side surfaces hinged to the top surface are in contact with the outer sides of the side surfaces hinged to the bottom surface of the outer packaging.

In a further alternative embodiment, the outer packaging is in the form of a single-piece folding box with

- a bottom surface and four side surfaces hinged to the bottom surface,
- a top surface and four side surfaces hinged to the top surface,
- an intermediate surface which connects a side surface of the bottom surface to a side surface of the top surface, wherein, in the closed state, the side surfaces of the outer packaging hinged to the top surface overlap with the side surfaces hinged to the bottom surface of the outer packaging such that three of the inner sides of the side surfaces hinged to the top surface are in contact with the outer sides of the side surfaces hinged to the bottom surface of the outer packaging, and the intermediate surface is located between the outer side of the side surface connected to it and hinged to the bottom surface and the inner side of the side surface connected to it and hinged to the top surface. This embodiment enables easier opening of the outer packaging. At the same time, in the closed state, the outer packaging forms a triply-overlapping side surface in the region of the intermediate surface, which side surface is formed from a side surface hinged to the bottom surface, the intermediate surface, and the side surface hinged to the top surface. This reinforced side wall stabilizes the outer packaging during storage and transportation.

In a preferred embodiment of the three last-mentioned detergent supply forms, at least 30%, preferably at least 60%, and in particular at least 80%, of the surface of the inner sides of the side surfaces hinged to the top surface overlap with at least 30%, preferably at least 60%, and in particular at least 80%, of the area of the outer sides of the side surfaces hinged to the bottom surface of the outer packaging.

The previously described outer packagings with overlapping side walls can be repeatedly opened and closed without any significant reduction in the friction occurring between the overlapping side walls. The preferred embodiment of the side walls with cavities is suitable for further improving this resealability. A possible explanation for this may be compressibility of the side walls caused by the cavities.

The outer packaging serves, among other things, to provide mechanical protection for the cuboid washing agent shaped bodies. Since the cuboid washing agent shaped bodies can be subject to mechanical loads from all spatial directions, the bottom surface, the top surface and the side surfaces are preferably each designed such that they offer mechanical protection for the cuboid washing agent shaped bodies. Such mechanical protection can be achieved, for example, by using shock-absorbing materials to produce the outer packaging. An example of shock-absorbing packaging material is corrugated cardboard.

A feature of preferred outer packagings is the COBB value of the cardboard used for its production in the range below 25 g/m$^2$, and preferably below 20 g/m$^2$. The COBB value is a measurement of the resistance of paper and cardboard to the penetration of moisture into the material. A high COBB value means that water penetrates more easily. A low COBB value means that water penetrates the material only with difficulty. The COBB value is determined in accordance with DIN EN ISO 535 under 20 g/m$^2$ at 20° C. and standard pressure. Particularly preferred washing agent presentation forms are characterized in that the cardboard used to produce the folding box has a Cobb value below 25 g/m$^2$, preferably below 20 g/m$^2$.

Corresponding COBB values can be realized in different ways. In an alternative embodiment, the outer packaging comprises, for example, a water-insoluble cover film, preferably a polyethylene cover film. Water-insoluble cover films are generally suitable for preventing or at least reducing the admission of water or water vapor through the outer packaging into the interior of the outer packaging.

To avoid superfluous packaging components, water-insoluble cover films are preferably applied only on the outer or inner side of the outer packaging. For effective limitation of the admission of moisture, full coverage is preferred.

The advantages of full coverage of the outer side of the outer packaging consist, in addition to improved printability of the outer packaging surface, in preventing the admission of water into the cellulose-based packaging material, thus avoiding, for example, the formation of superficial water spots or swelling of the outer packaging.

The full coverage of the inner side of the outer packaging has surprisingly proven advantageous for the adhesion of unpackaged washing agent shaped bodies, in particular unpackaged washing agent tablets. In the case of a combination of unpackaged tablet and the cardboard forming the outer packaging being covered on the inner side with a water-insoluble cover film, the adhesion of shaped bodies to the surface of the cardboard is increased, as a result of which in particular the sliding and associated mechanical impacts and damage to the shaped bodies in the outer packaging associated with transportation are reduced.

Despite the technical advantages listed above, it may be preferred, for reasons of sustainable production and packaging of the washing agent shaped bodies, if the outer packaging does not comprise any water-insoluble cover film.

Biodegradable hydrophobic coatings or impregnations have proven to be alternatives to water-insoluble cover films. Particularly preferred is the use of biodegradable hydrophobic coatings or impregnations which comprise a substance from the group of vegetable oils, plant or animal waxes, lignin and lignin derivatives, celluloses and cellulose derivatives, polylactic acid and polylactic acid derivatives.

The washing agent shaped bodies are an essential component of the washing agent presentation form according to the invention. A "shaped body" is a single body that stabilizes itself in the shape imparted to it. This dimensionally stable body is formed from a molding compound (e.g. a composition) in such a way that this molding compound is deliberately brought into a predetermined shape, for example by pouring a liquid composition into a casting mold and then curing the liquid composition, or by compacting a particulate preliminary mixture, for example in the context of a tableting process.

Not only presentation forms for textile washing but also presentation forms for cleaning hard surfaces such as ceramics, glass, metal or tiles are referred to as washing agent shaped bodies. Particularly preferred are washing agent shaped bodies, in particular washing agent shaped bodies for textile washing, since they are usually characterized by a comparatively low hardness due to the need for rapid disintegration in the washing liquor. The washing agent shaped bodies preferably have a weight of 14 g to 42 g, more preferably of 20 g to 38 g, in particular of 24 g to 34 g.

Due to their manufacturability and their properties relating to removal from the outer packaging, washing agent shaped bodies which have a flat lower face, the largest diagonal of which is more than twice, preferably more than four times the height of the washing agent shaped bodies, are preferred.

It is particularly preferred if the washing agent shaped bodies are present as tablets or comprise tablets.

The cuboidal washing agent shaped bodies comprise a lower face, an upper face and a lateral face connecting the lower face and the upper face. It has also proven advantageous for the stability of the shaped bodies if the edges delimiting the lower face and the upper face are chamfered. To increase the stability of the shaped bodies, it may also be appropriate to round off the edges of the lateral faces connecting the lower faces and the upper faces.

The upper face of the cuboid washing agent shaped bodies preferably runs plane-parallel to their lower face. The upper face can be flat or have a cavity. The cavity can be filled or unfilled. Particularly preferred cuboid washing agent shaped bodies have no cavity in their upper face.

The density of preferred washing agent shaped bodies is 1.1 g/cm$^3$ to 1.5 g/cm$^3$, preferably 1.15 g/cm$^3$ to 1.3 g/cm$^3$. As a consequence of the high density of the shaped bodies and the high fill level, the washing agent presentation forms according to the invention have comparatively high densities, for example, densities in the range of 0.9 g/cm$^3$ to 1.4 g/cm$^3$, preferably in the range of 1.05 g/cm$^3$ to 1.3 g/cm$^3$.

Preferred washing agent shaped bodies have a rough upper face or a rough lower face, the average roughness of which is from 25 μm to 1,000 μm, preferably from 50 μm to 800 μm. Roughness describes the deviation of a real surface from an ideally smooth surface and is determined, for example, by means of confocal laser scanning microscopy.

The roughness values preferred according to the invention reduce abrasion of the shaped bodies during production and transportation and at the same time ensure sufficient adhesion of the shaped bodies to the material of the outer packaging and to the other shaped bodies located in the outer packaging, as a result of which they are stabilized within the outer packaging.

An essential feature of the washing agent presentation form according to the invention is its fill level of 50 to 84 vol. %, preferably 55 to 84 vol. % and in particular 60 to 84 vol. % of the outer packaging. The term "fill level" refers to the proportion of the internal volume of the outer packaging that is taken up by the washing agent shaped bodies in the outer packaging.

In the simplest case, "void volume" refers to that portion of the internal volume of the outer packaging which is not occupied by the washing agent shaped bodies. If there are additional elements in the internal volume of the outer packaging, for example separating elements such as bars, intermediate bottoms or inserts, the volume occupied by these additional elements is added to the fill level.

In preferred embodiments, 35% to 70%, in particular 35 to 60%, of the void volume of the outer packaging is between the upper side of the upper shaped body layer and the inner side of the top surface. This volume located between the upper side of the upper shaped body layer and the inner side of the top surface is delimited not only by the upper side of the upper shaped body layer (bottom side of the volume) and the inner side of the top surface (upper side of the volume), but also by side walls which result from the continuation of the side walls of the washing agent shaped bodies of the upper shaped body layer in the direction of the inner side of the top surface.

In order to reduce the proportion of packaging per washing agent shaped body, it is preferred if the washing agent presentation form comprises at least ten, preferably at least twenty, particularly preferably at least thirty, washing agent shaped bodies which are in a layered, sorted arrangement in the outer packaging.

In the case of integration of a larger number of washing agent shaped bodies into the washing agent presentation form, the stability of the shaped bodies can be further improved by a targeted arrangement of the shaped bodies. Preference is given to washing agent presentation forms which comprise at least ten, preferably at least twenty, particularly preferably at least thirty, washing agent shaped bodies which are in a layered, sorted arrangement in the outer packaging such that each of the washing agent shaped bodies is adjacent to at least three other washing agent shaped bodies.

Preferably, the cuboid washing agent shaped bodies are arranged such that each cuboid washing agent shaped body adjoins a side surface of an adjacent cuboid washing agent shaped body with at least three of its six side surfaces. The adjacent sides or surfaces of two adjacent washing agent shaped bodies are preferably aligned plane-parallel to each other.

Preferably, each of the cuboid washing agent shaped bodies is in direct contact with at least one other cuboid washing agent shaped body via its lower face or its upper face. Furthermore, it is preferred if each of the cuboid washing agent shaped bodies is in direct contact with at least one other cuboid washing agent shaped body via its lateral face.

In preferred washing agent presentation forms, the washing agent shaped bodies are arranged in two, three or four layers in the outer packaging.

In order to improve their transport stability and to avoid shaped body breakage, the shaped bodies are preferably arranged in the outer packaging such that the axes of rotation of the washing agent shaped bodies, along which they have the lowest shaped body hardness, extend in parallel with the bottom surface of the outer packaging.

This type of arrangement is advantageous particularly in the case of cuboid washing agent shaped bodies, for example cuboid washing agent tablets, which have three two-fold axes of rotation, wherein the levels of shaped body or tablet hardness, which the washing agent shaped bodies or tablets have along these three axes of rotation, differ from one another. In preferred embodiments, the cuboid washing agent shaped bodies or tablets have three two-fold axes of rotation, wherein the lowest level of shaped body or tablet hardness, which the washing agent shaped bodies or tablets have along one of these three axes of rotation, is at least 20%, preferably at least 40%, and in particular at least 60%, below the next highest level of shaped body or tablet hardness along one of the two remaining axes of rotation.

The shaped body or tablet hardnesses which the cuboid washing agent shaped bodies or tablets have along their three two-fold axes of rotation are preferably from 50 N to 300 N, preferably from 70 N to 200 N. The lowest shaped body or tablet hardness which one of the three axes of rotation has is preferably in the range from 50 N to 150 N, preferably from 60 N to 130 N. The hardness of the shaped bodies or tablets is measured by deforming the shaped body or tablet until it breaks, wherein the force acts on the side surfaces of the shaped body or tablet and the maximum force which the shaped body or tablet can withstand is determined. In order to determine the level of shaped body or tablet hardness, a tablet testing apparatus from the company Sotax is suitable, for example.

As mentioned above, it was surprisingly possible to increase the storage and transportation stability of the washing agent shaped bodies by their sorting and arrangement in the outer packaging. In this context, it has been found that not only the chemical but also the physical stability of the detergent shaped bodies are influenced by the type of orientation of the detergent shaped bodies in the packaging.

Due to the suitable orientation of the cuboid detergent shaped bodies in outer packaging based on corrugated cardboard, adhesion of the shaped bodies to the surface of the cardboard can be increased and slippage of the shaped bodies during transportation and also the associated fracturing or abrasion of the shaped bodies can be prevented. In a preferred embodiment of the detergent supply form, the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of detergent shaped bodies which are resting directly on the bottom surface of the outer packaging runs parallel to the corrugations of the corrugated cardboard.

The detergent shaped bodies can be oriented in the outer packaging such that the lower face of the detergent shaped bodies, which are resting directly on the bottom surface of the outer packaging, runs orthogonally to the bottom surface of the outer packaging. In order to improve the adhesion of the detergent shaped bodies, however, it has proven advantageous if detergent shaped bodies with a cuboid geometry, in which the diagonal of the lower face of the detergent shaped body is more than twice, preferably more than four times the height of the detergent shaped bodies, are in a sorted arrangement in the outer packaging made of corrugated cardboard such that the lower face of detergent shaped bodies which are resting directly on the bottom surface of the outer packaging runs plane-parallel to the bottom surface of the outer packaging and the longitudinal direction of detergent shaped bodies which are resting directly on the bottom surface of the outer packaging runs parallel to the corrugations of the corrugated cardboard.

To reduce water vapor permeability, the outer packaging can be equipped with a water-insoluble cover film, preferably a polyethylene cover film. While the reduction of water vapor ingress is ensured in a comparable manner by water-insoluble cover films on the outer face or the inner face of the outer packaging, it has proven advantageous for the adhesion of the detergent shaped bodies to the surface of the outer packaging if the outer packaging comprises a water-insoluble cover film, preferably a polyethylene cover film, which preferably covers the outer packaging over its entire surface on the inner side.

This effect can further be enhanced by the preparation of the detergent shaped bodies in film packaging. Detergent supply forms in which each of the detergent shaped bodies has a separate film packaging are particularly preferred. When determining the fill level of the outer packaging, the film packaging is added to the washing agent shaped body. In other words, the fill level is the proportion of the internal volume of the outer packaging occupied by the washing agent shaped bodies contained in the outer packaging and their film packaging.

If film packagings are used, film packagings made of a water-soluble film material are preferred. The water-soluble film material may comprise one or more structurally different water-soluble polymer(s). Suitable water-soluble polymer(s) are in particular polymers from the group of (optionally acetalized) polyvinyl alcohols (PVAL) and copolymers thereof.

Water-soluble film materials are preferably based on a polyvinyl alcohol or a polyvinyl alcohol copolymer of which the molecular weight is in the range of from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis of 70 to 100 mol. %, preferably 80 to 90 mol. %, particularly preferably 81 to 89 mol. %, and in particular 82 to 88 mol. %.

Preferred polyvinyl alcohol copolymers comprise, in addition to vinyl alcohol, an ethylenically unsaturated carboxylic acid, the salt thereof, or the ester thereof. In addition to vinyl alcohol, polyvinyl alcohol copolymers of this kind particularly preferably contain sulfonic acids such as 2-acrylamido-2-methyl-1-propane sulfonic acid (AMPS), acrylic acid, methacrylic acid, acrylic acid ester, methacrylic acid ester, or mixtures thereof; of the esters, $C_{1-4}$ alkyl esters or $C_{1-4}$ hydroxyalkyl esters are preferred. Ethylenically unsaturated dicarboxylic acids, for example itaconic acid, maleic acid, fumaric acid and mixtures thereof, are possible as further monomers.

Due to their availability, easy processability and biodegradability, film packagings that consist of at least 40 wt. %, preferably at least 60 wt. % and in particular at least 80 wt. % of polyvinyl alcohol are preferred.

In order to increase the stability of the shaped bodies and to ensure a sufficient degree of filling in the outer packaging, it is preferred for the film packaging to be shrunk onto the washing agent shaped bodies.

In a particularly preferred embodiment, the shrink-wrapped film packaging completely encloses the washing agent shaped body.

In addition to physical stability and integrity, the targeted orientation of the cuboid detergent shaped bodies in outer packaging is also suitable for increasing the chemical stability of the shaped bodies. This effect relates in particular to detergent shaped bodies of high hygroscopicity or outer packaging with a high level of water vapor ingress. In corresponding detergent supply forms, the detergent shaped bodies tend to adhere to the surface of the outer packaging. During the detachment of adherent detergent shaped bodies from the inner face of the outer packaging, shaped bodies can then break.

To prevent adhesion, a detergent supply form has proven advantageous in which the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of detergent shaped bodies which are resting directly on the bottom surface of the outer packaging runs orthogonally to the corrugations of the corrugated cardboard.

In the context of this embodiment, the alignment of the detergent shaped bodies in the outer packaging can be effected in such a way that the longitudinal direction of the detergent shaped bodies which are resting directly on the bottom surface of the outer packaging runs orthogonally to the corrugations of the corrugated cardboard. Due to the reduced tendency to adhere, it is however preferred for the cuboid detergent shaped bodies to be in a sorted arrangement in the outer packaging made of corrugated cardboard such that the lower face of detergent shaped bodies which are resting directly on the bottom surface of the outer packaging runs orthogonally to the bottom surface of the outer packaging and the longitudinal direction of detergent shaped bodies which are resting directly on the bottom surface of the outer packaging runs orthogonally to the corrugations of the corrugated cardboard.

To reduce the tendency of the detergent shaped bodies to adhere, the outer packaging has no water-insoluble cover film on its inner side. A further reduction in adhesion can be achieved if the detergent shaped bodies do not have a separate film packaging, in particular no film packaging made of a water-soluble film material.

To improve water vapor ingress properties, the outer packaging can comprise a water-insoluble cover film, preferably a polyethylene cover film, which covers the outer packaging on its outer face, preferably over the entire surface.

Despite the technical advantages listed above, it may be preferred, for reasons of sustainable production and packaging of the washing agent shaped bodies, if the outer packaging does not comprise any water-insoluble cover film.

Washing agent shaped bodies which are particularly preferably suitable for packaging in the washing agent presentation forms according to the invention are in particular washing agent shaped bodies which have a water absorption (2 weeks, 35° C., 80% relative humidity) above 20 mg/g, preferably above 30 mg/g.

Also suitable for packaging in the washing agent presentation forms are washing agent shaped bodies which have a volume expansion (2 weeks, 35° C., 80% relative humidity) above 5 vol. %, preferably above 7 vol. % and in particular from 8 vol. % to 25 vol. %. This type of increase in volume can be observed, for example, in washing agent shaped bodies which contain a disintegration aid, in particular a polymeric disintegration aid, for example a disintegration aid based on polyvinylpyrrolidone or cellulose.

The arrangement and positioning according to the invention of the washing agent shaped bodies in the outer packaging is particularly suitable for washing agent shaped bodies with a heterogeneous expansion relative to the three spatial directions. Particularly suitable for outer packaging are cuboid washing agent shaped bodies with a flat bottom side, the largest diagonal of which is more than twice, preferably more than four times, the height of the washing agent shaped bodies, which, during storage, show disproportionate expansion relative to their height. In the case of such washing agent shaped bodies, in particular washing agent tablets, the height expansion is, for example, more than 7%, in particular more than 12%, while the width and length expansion is less than 7%, in particular less than 5%.

For example, a storage period of 2 weeks at 35° C. and 80% relative humidity is suitable as a storage condition for determining the heterogeneous expansion relative to the three spatial directions.

In summary, the following subjects, inter alia, are provided by this application:

1. A washing agent presentation form, comprising
   a) an outer packaging having a bottom surface, a top surface, and side walls connecting the bottom surface and the top surface,
   b) cuboid detergent shaped bodies having a lower face, an upper face and a lateral face connecting the lower face and the upper face, wherein
      i) the outer packaging contains at least eight washing agent shaped bodies which are arranged in layers in the outer packaging such that each of the washing agent shaped bodies is adjacent to at least three other washing agent shaped bodies;
      ii) the outer packaging has a fill level of 50 vol. % to 84 vol. %;
      iii) 35% to 80% of the void volume of the outer packaging is between the upper side of the upper shaped body layer and the inner side of the top surface.
2. The washing agent presentation form according to point 1, wherein the outer packaging has a flat bottom surface, the largest diagonal of which is greater than the height of the outer packaging.
3. The washing agent presentation form according to one of the preceding points, wherein the outer packaging has a flat bottom surface, the largest diagonal of which is more than twice, preferably more than four times, the height of the outer packaging.
4. The washing agent presentation form according to one of the preceding points, wherein the outer packaging has an angular bottom surface, preferably a quadrilateral bottom surface, very particularly preferably a rectangular bottom surface.
5. The washing agent presentation form according to one of the preceding points, wherein the outer packaging has a top surface plane-parallel to the bottom surface.
6. The washing agent presentation form according to one of the preceding points, wherein the outer packaging has a cuboidal shape.
7. The washing agent presentation form according to one of the preceding points, wherein the outer packaging is reclosable.
8. The washing agent presentation form according to one of the preceding points, wherein the washing agent shaped bodies have a weight of 14 g to 42 g, preferably of 20 g to 38 g, in particular of 24 g to 34 g.
9. The washing agent presentation form according to one of the preceding points, wherein the washing agent shaped bodies are present as tablets.
10. The washing agent presentation form according to one of the preceding points, wherein the washing agent shaped bodies have a flat lower face, the largest diagonal of which is more than twice, preferably more than four times, the height of the washing agent shaped bodies.
11. The washing agent presentation form according to one of the preceding points, wherein the washing agent shaped bodies have three two-fold axes of rotation and the levels of shaped body hardness, which the washing agent shaped bodies have along these three axes of rotation, differ from one another.

12. The washing agent presentation form according to one of the preceding points, wherein the washing agent shaped bodies have three two-fold axes of rotation and the washing agent shaped bodies are arranged in the outer packaging such that the axes of rotation of the washing agent shaped bodies, along which they have the lowest shaped body hardness, run parallel with the bottom surface of the outer packaging.
13. The washing agent presentation form according to one of the preceding points, wherein the washing agent shaped bodies have three two-fold axes of rotation, and the lowest level of shaped body hardness, which the washing agent shaped bodies have along one of these three axes of rotation, is at least 20%, preferably at least 40%, and in particular at least 60% below the next higher level of shaped body hardness along one of the two remaining axes of rotation.
14. The washing agent presentation form according to one of the preceding points, wherein the washing agent shaped bodies have three two-fold axes of rotation, and the levels of shaped body hardness which the washing agent shaped bodies have along these three axes of rotation are from 50 N to 300 N, preferably from 70 N to 200 N.
15. The washing agent presentation form according to one of the preceding points, wherein the washing agent shaped bodies have three two-fold axes of rotation, and the lowest level of shaped body hardness, which the washing agent shaped bodies have along one of these three axes of rotation, is from 50 N to 150 N, preferably from 60 N to 130 N.
16. The washing agent presentation form according to one of the preceding points, comprising cuboid washing agent tablets having a lower face, an upper face and lateral faces connecting the lower face and the upper face, wherein the edges delimiting the lower face and the upper face are chamfered.
17. The washing agent presentation form according to one of the preceding points, comprising cuboid washing agent tablets having a lower face, an upper face and lateral faces connecting the lower face and the upper face, wherein the upper face of the washing agent shaped body does not have any cavities.
18. The washing agent presentation form according to one of the preceding points, comprising cuboid washing agent tablets having a lower face, an upper face and lateral faces connecting the lower face and the upper face, wherein the edges of the lateral faces connecting the lower face and the upper face are rounded.
19. The washing agent presentation form according to one of the preceding points, wherein the washing agent presentation form comprises at least ten, preferably at least twenty, particularly preferably at least thirty, washing agent shaped bodies, which are in a layered, sorted arrangement in the outer packaging such that each of the washing agent shaped bodies adjoins at least three other washing agent shaped bodies.
20. The washing agent presentation form according to one of the preceding points, wherein the cuboid washing agent shaped bodies are arranged such that each cuboid washing agent shaped body adjoins a side surface of an adjacent cuboid washing agent shaped body with at least three of its six side surfaces.
21. The washing agent presentation form according to one of the preceding points, wherein the adjacent sides or surfaces of two adjacent washing agent shaped bodies are aligned plane-parallel to one another.
22. The washing agent presentation form according to one of the preceding points, wherein each of the cuboid washing agent shaped bodies is in direct contact with at least one further cuboid washing agent shaped body via its lower face or its upper face.
23. The washing agent presentation form according to one of the preceding points, wherein each of the cuboid washing agent shaped bodies is in direct contact with at least one further cuboid washing agent shaped body via its lateral face.
24. The washing agent presentation form according to one of the preceding points, wherein the washing agent shaped bodies are arranged in the outer packaging in two, three or four layers.
25. The washing agent presentation form according to one of the preceding points, wherein the washing agent shaped bodies have a density of 1.1 $g/cm^3$ to 1.5 $g/cm^3$, preferably of 1.15 $g/cm^3$ to 1.3 $g/cm^3$.
26. The washing agent presentation form according to one of the preceding points, wherein the washing agent shaped bodies have a rough upper face or a rough lower face, the average roughness of which is from 25 μm to 1,000 μm, preferably from 50 μm to 800 μm.
27. The washing agent presentation form according to one of the preceding points, wherein the outer packaging has a fill level of 55 to 84 vol. %, preferably of 60 to 84 vol. %.
28. The washing agent presentation form according to one of the preceding points, wherein 35% to 70%, in particular 35% to 60% of the void volume of the outer packaging is between the upper side of the upper shaped body layer and the inner side of the top surface.
29. The washing agent presentation form according to one of the preceding points, wherein the outer packaging is made of cardboard.
30. The washing agent presentation form according to one of the preceding points, wherein the outer packaging is made of corrugated cardboard.
31. The washing agent presentation form according to one of the preceding points, wherein the outer packaging is designed as a folding box.
32. The washing agent presentation form according to one of the preceding points, wherein the outer packaging is designed as a crimping box.
33. The washing agent presentation form according to one of the preceding points, wherein the outer packaging is designed as a hollow edge box.
34. The washing agent presentation form according to one of the preceding points, wherein at least one, preferably at least two, of the side walls of the outer packaging have a cavity or several cavities, the volume(s) of which is/are at least 10 vol. % of the volume of the respective side wall.
35. The washing agent presentation form according to one of the preceding points, wherein at least two opposing side walls of the outer packaging have a cavity or a plurality of cavities, the volume(s) of which is/are at least 10 vol. % of the volume of the relevant side wall.
36. The washing agent presentation form according to one of the preceding points, wherein all side walls of the outer packaging have a cavity or a plurality of cavities, the volume(s) of which is/are at least 10 vol. % of the volume of the relevant side wall.
37. The washing agent presentation form according to one of the preceding points, wherein the volume of the cavity/cavities is at least 20 vol. %, preferably at least 40 vol. %, of the volume of the relevant side wall.

38. Detergent supply form according to any one of the preceding points, wherein the outer packaging is designed as a hinged lid box.
39. The washing agent presentation form according to one of the preceding points, wherein the outer packaging is designed as a single-piece folding box having
    i) a bottom surface and four side surfaces hinged to the bottom surface,
    ii) a top surface and at least three side surfaces hinged to the top surface,
    wherein the side surfaces of the outer packaging hinged to the top surface overlap in the closed state with the side surfaces hinged to the bottom surface of the outer packaging.
40. The washing agent presentation form according to point 39, wherein, in the closed state, the side surfaces of the outer packaging hinged to the top surface overlap with the side surfaces hinged to the bottom surface of the outer packaging in such a way that the outer sides of the side surfaces hinged to the top surface are in contact with the inner sides of the side surfaces hinged to the bottom surface of the outer packaging.
41. The washing agent presentation form according to point 39, wherein at least 30%, preferably at least 60%, and in particular at least 80%, of the area of the outer sides of the side surfaces hinged to the top surface overlap with at least 30%, preferably at least 60%, and in particular at least 80%, of the area of the inner sides of the side surfaces hinged to the bottom surface of the outer packaging.
42. The washing agent presentation form according to point 39, wherein, in the closed state, the side surfaces of the outer packaging hinged to the top surface overlap with the side surfaces hinged to the bottom surface of the outer packaging in such a way that at least one inner side of a side surface hinged to the top surface is in contact with at least one outer side of the side surfaces hinged to the bottom surface of the outer packaging.
43. The washing agent presentation form according to point 39, wherein, in the closed state, the side surfaces of the outer packaging hinged to the top surface overlap with the side surfaces hinged to the bottom surface of the outer packaging in such a way that all inner sides of the side surfaces hinged to the top surface are in contact with the outer sides of the side surfaces hinged to the bottom surface of the outer packaging.
44. The washing agent presentation form according to one of the preceding points, comprising an outer packaging made of cardboard in the form of a single-piece folding box with
    i) a bottom surface and four side surfaces hinged to the bottom surface,
    ii) a top surface and four side surfaces hinged to the top surface,
    iii) an intermediate surface which connects a side surface of the bottom surface to a side surface of the top surface, wherein, in the closed state, the side surfaces of the outer packaging hinged to the top surface overlap with the side surfaces hinged to the bottom surface of the outer packaging such that three of the inner sides of the side surfaces hinged to the top surface are in contact with the outer sides of the side surfaces hinged to the bottom surface of the outer packaging, and the intermediate surface is located between the outer side of the side surface connected to it and hinged to the bottom surface and the inner side of the side surface connected to it and hinged to the top surface.

45. The washing agent presentation form according to one of points 42 through 44, wherein at least 30%, preferably at least 60%, and in particular at least 80%, of the area of the inner sides of the side surfaces hinged to the top surface overlap with at least 30%, preferably at least 60%, and in particular at least 80%, of the area of the outer sides of the side surfaces hinged to the bottom surface of the outer packaging.
46. The washing agent presentation form according to one of the preceding points, wherein the bottom surface, the top surface and the side surfaces are each designed in such a way that they offer mechanical protection for the cuboid washing agent shaped bodies.
47. The washing agent presentation form according to one of the preceding points, wherein cardboard is used to produce the outer packaging, which has a COBB value below 25 $g/m^2$, preferably below 20 $g/m^2$.
48. The washing agent presentation form according to one of the preceding points, wherein the outer packaging comprises a water-insoluble cover film, preferably a polyethylene cover film.
49. The washing agent presentation form according to one of the preceding points, wherein the outer packaging comprises a water-insoluble cover film, preferably a polyethylene cover film, which covers the outer packaging on its outer side, preferably over the entire surface.
50. The washing agent presentation form according to one of the preceding points, wherein the outer packaging comprises a water-insoluble cover film, preferably a polyethylene cover film, which covers the outer packaging on its inner side, preferably over the entire surface.
51. The washing agent presentation form according to one of the preceding points, wherein the outer packaging does not comprise any water-insoluble cover film.
52. The washing agent presentation form according to one of the preceding points, wherein the outer packaging has a biodegradable hydrophobic coating or impregnation.
53. The washing agent presentation form according to one of the preceding points, wherein the outer packaging has a biodegradable hydrophobic coating or impregnation which comprises a substance from the group of vegetable oils, plant or animal waxes, lignin and lignin derivatives, celluloses and cellulose derivatives, polylactic acid and polylactic acid derivatives.
54. The washing agent presentation form according to one of the preceding points, wherein
    the outer packaging is made of corrugated cardboard and
    the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of the detergent shaped bodies which are resting directly on the bottom surface of the outer packaging run parallel to the corrugations of the corrugated cardboard.
55. The washing agent presentation form according to one of the preceding points,
    the outer packaging of which is made of corrugated cardboard and
    the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the lower face of detergent shaped bodies, which are resting directly on the bottom surface of the outer packaging, runs orthogonally to the bottom surface of the outer packaging, and ii) the longitudinal direction of the detergent shaped bodies, which are resting directly on the bottom surface of the outer packaging, runs parallel to the corrugations of the corrugated cardboard.

56. The washing agent presentation form according to one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, and the detergent shaped bodies of which are in a sorted arrangement in the outer packaging such that i) the lower face of the detergent shaped bodies, which are resting directly on the bottom surface of the outer packaging, runs plane-parallel to the bottom surface of the outer packaging, and ii) the longitudinal direction of the detergent shaped bodies, which are resting directly on the bottom surface of the outer packaging, runs parallel to the corrugations of the corrugated cardboard.

57. The washing agent presentation form according to one of the preceding points, wherein the washing agent shaped bodies have a film packaging.

58. The washing agent presentation form according to one of the preceding points, wherein each of the washing agent shaped bodies has a separate film packaging.

59. The washing agent presentation form according to one of the preceding points, wherein the washing agent shaped bodies have a film packaging made of a water-soluble film material.

60. The washing agent presentation form according to one of the preceding points, wherein the washing agent shaped bodies have a film packaging which consists of polyvinyl alcohol of at least 40 wt. %, preferably at least 60 wt. %, and in particular at least 80 wt. %.

61. The washing agent presentation form according to one of the preceding points, wherein the washing agent shaped bodies have a film packaging which is shrink-wrapped onto the washing agent shaped body.

62. The washing agent presentation form according to one of the preceding points, wherein the washing agent shaped bodies have a film packaging which is shrink-wrapped onto the washing agent shaped body and the shrink-wrapped film packaging completely encloses the washing agent shaped body.

63. The washing agent presentation form according to one of the preceding points, wherein the outer packaging comprises a water-insoluble cover film-preferably a polyethylene cover film which covers the outer packaging on its outer side-preferably over the entire surface.

64. The washing agent presentation form according to one of the preceding points, wherein the outer packaging does not comprise any water-insoluble cover film on its inner side.

65. The washing agent presentation form according to one of the preceding points, wherein the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of the detergent shaped bodies which are resting directly on the bottom surface of the outer packaging run orthogonally to the corrugations of the corrugated cardboard.

66. The washing agent presentation form according to one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the lower face of the detergent shaped bodies, which are resting directly on the bottom surface of the outer packaging, runs plane-parallel to the bottom surface of the outer packaging, and ii) the longitudinal direction of the detergent shaped bodies, which are resting directly on the bottom surface of the outer packaging, runs orthogonally to the corrugations of the corrugated cardboard.

67. The washing agent presentation form according to one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the lower face of detergent shaped bodies, which are resting directly on the bottom surface of the outer packaging, runs orthogonally to the bottom surface of the outer packaging, and ii) the longitudinal direction of the detergent shaped bodies, which are resting directly on the bottom surface of the outer packaging, runs orthogonally to the corrugations of the corrugated cardboard.

68. The washing agent presentation form according to one of the preceding points, wherein the washing agent shaped bodies do not have film packaging.

69. The washing agent presentation form according to one of the preceding points, wherein the washing agent shaped bodies have a water absorption (2 weeks, 35° C., 80% relative humidity) above 20 mg/g, and preferably above 30 mg/g.

70. The washing agent presentation form according to one of the preceding points, wherein the washing agent shaped bodies have a volume expansion (2 weeks, 35° C., 80% relative humidity) above 5 vol. %, preferably above 7 vol. %, and in particular of 8 vol. % to 25 vol. %.

71. The washing agent presentation form according to one of the preceding points, wherein the washing agent shaped bodies contain a disintegration agent, in particular a polymeric disintegration agent, for example a disintegration agent based on polyvinylpyrrolidone or cellulose.
72. The washing agent presentation form according to one of the preceding points, wherein the cuboid washing agent shaped bodies have a flat bottom side, the largest diagonal of which is more than twice, preferably more than four times, the height of the washing agent shaped bodies, and the washing agent shaped bodies have a height expansion of more than 7%, in particular more than 12%, and an expansion in width and length of less than 7%, in particular less than 5%, when stored (2 weeks, 35° C., 80% relative humidity).

EXAMPLES

The adhesion behavior of detergent tablets on corrugated cardboard was investigated. For this purpose, the corrugated board to be examined is fastened flat on the horizontally aligned main platform of a friction measuring device. A washing agent tablet (length 6.7 cm, width 2.5 cm, height 1.5 cm, weight 29 g) is placed on the cardboard surface, at one end of which tablet a small metal body is attached, which allows the tablet to be held by means of a magnet. The main platform of the friction measuring device is then tilted out of the horizontal and the angle to the horizontal is determined at which the tablet detaches from the magnet (each of the measurements was carried out 3 times and the mean value of the measured values was formed). The results of the measurement are shown in the tables below.

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | PE cover film | Lower face with the longitudinal direction of the tablet in the direction of sliding | Shrunk-on PVA film | 45° |
| Orthogonally to the slide direction of the tablet | PE cover film | Lower face side with the longitudinal direction of the tablet in the direction of sliding | Shrunk-on PVA film | 42° |

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | None | Lower face with the longitudinal direction of the tablet in the direction of sliding | Shrunk-on PVA film | 35° |
| Orthogonally to the slide direction of the tablet | None | Lower face with the longitudinal direction of the tablet in the direction of sliding | Shrunk-on PVA film | 32° |

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | PE cover film | Lower face with the longitudinal direction of the tablet in the direction of sliding | Shrunk-on PVA film | 24° |

-continued

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | None | Lower face with the longitudinal direction of the tablet in the direction of sliding | None | 16° |

The invention claimed is:

1. A washing agent presentation form, comprising:
an outer packaging comprising a bottom wall, a top wall, and side walls connecting the bottom wall and the top wall; and,
cuboid-shaped detergent bodies each having a lower face, an upper face, and a lateral face between the lower face and the upper face, wherein:
the outer packaging contains at least eight of the cuboid-shaped detergent bodies layered within the outer packaging such that each of the cuboid-shaped detergent bodies is adjacent to at least three other cuboid-shaped detergent bodies,
the outer packaging has a fill level of from 50 vol. % to 84 vol. %, based on the total interior volume of the outer packaging, and
35% to 80% of a void volume within the outer packaging is between an upper side of an upper layer of cuboid-shaped detergent bodies and an inner surface of the top wall.

2. The washing agent presentation form of claim 1, wherein the outer packaging has a fill level of from 55 vol. % to 84 vol. %, based on the total interior volume of the outer packaging.

3. The washing agent presentation form of claim 1, wherein 35% to 70% of the void volume within the outer packaging is between the upper side of the upper layer of cuboid-shaped detergent bodies and the inner surface of the top wall.

4. The washing agent presentation form of claim 1, wherein the outer packaging is made of corrugated cardboard.

5. The washing agent presentation form of claim 1, wherein the outer packaging comprises a water-insoluble cover film at least partially covering an inner surface of the bottom wall, the top wall, and the side walls.

6. The washing agent presentation form of claim 4, wherein:
a diagonal of the lower face of each cuboid-shaped detergent body is more than twice a height of each cuboid-shaped detergent body,
the lower face of each of the at least eight cuboid-shaped detergent bodies runs orthogonally to the bottom wall of the outer packaging, and
a longitudinal axis extending through the at least eight cuboid-shaped detergent bodies runs parallel to corrugations of the corrugated cardboard.

7. The washing agent presentation form of claim 1, wherein each of the cuboid-shaped detergent bodies is covered with a separate film packaging.

8. The washing agent presentation form of claim 7, wherein the film packaging is shrink-wrapped onto each cuboid-shaped detergent body.

9. The washing agent presentation form of claim 1, wherein the outer packaging does not comprise any water-insoluble cover film covering an inner surface of the bottom wall, the top wall, and the side walls.

10. The washing agent presentation form of claim 4, wherein:
a diagonal of the lower face of each cuboid-shaped detergent body is more than twice a height of each cuboid-shaped detergent body,
the lower face of each of the at least eight cuboid-shaped detergent bodies runs plane-parallel to the bottom wall of the outer packaging, and
a longitudinal axis extending through the at least eight cuboid-shaped detergent bodies runs orthogonal to corrugations of the corrugated cardboard.

11. The washing agent presentation form of claim 1, wherein the cuboid-shaped detergent bodies are not covered by a film packaging.

12. The washing agent presentation form of claim 1, wherein;
each of the cuboid-shaped detergent bodies has three two-fold axes of rotation, and
the at least eight cuboid-shaped detergent bodies are layered within the outer packaging such that the one axes of rotation of the three two-fold axes of rotation that has the lowest shaped body hardness runs parallel to the bottom wall of the outer packaging.

13. The washing agent presentation form of claim 1, wherein at least one of the side walls of the outer packaging has at least one cavity, the volume of the at least one cavity being at least 10 vol. % of the volume of the at least one side wall having the at least one cavity.

14. The washing agent presentation form of claim 1, wherein the outer packaging is designed as a single sheet that is folded to create the outer packaging, the single sheet having:
a bottom wall region and four side wall regions hinged to the bottom wall region; and
a top wall region and at least three side wall regions hinged to the top wall region,
wherein the side wall regions hinged to the top wall region overlap with the side wall regions hinged to the bottom wall region when the outer packaging is created and closed.

15. The washing agent presentation form of claim 1, wherein the outer packaging is designed as a single sheet of cardboard that is folded to create the outer packaging, the single sheet of cardboard having:
a bottom wall region and four side wall regions hinged to the bottom wall region,
a top wall region and four side wall regions hinged to the top wall region, and an intermediate wall region connected to a side wall region hinged to the bottom wall region and to a side wall region hinged to the top wall region, wherein the side wall regions hinged to the top wall region overlap with the side wall regions hinged to the bottom wall region when the outer packaging is created and closed, such that three of the side wall regions hinged to the top wall region are in contact with the side wall regions hinged to the bottom wall region, and the intermediate wall region is located between an outer surface of the side wall region connected to the intermediate wall region and hinged to the bottom wall region and an inner surface of the side wall region connected to the intermediate wall region and hinged to the top wall region.

16. The washing agent presentation form of claim 1, wherein a diagonal of the lower face of each cuboid-shaped detergent body is more than four times a height of each cuboid-shaped detergent body.

17. The washing agent presentation form of claim 2, wherein the outer packaging has a fill level of from 60 vol. % to 84 vol. %, based on the total interior volume of the outer packaging.

18. The washing agent presentation form of claim 3, wherein 35% to 60% of the void volume within the outer packaging is between the upper side of the upper layer of cuboid-shaped detergent bodies and the inner surface of the top wall.

19. The washing agent presentation form of claim 5, wherein the water-insoluble cover film is a polyethylene film.

20. The washing agent presentation form of claim 5, the water-insoluble cover film covers an entirety of the inner surface of the bottom wall, the top wall, and the side walls.

* * * * *